United States Patent [19]
Boer et al.

[11] Patent Number: 5,656,393
[45] Date of Patent: Aug. 12, 1997

[54] FLEXIBLE ELECTRODE, PRODUCT AND PROCESS OF FORMING SAME

[75] Inventors: Frank Peter Boer, Village of Golf, Fla.; James Daniel Idol, Jr., Worthington, Ohio; Ketan Vasantlal Shah, Bear, Del.; Cung Vu, Columbia, Md.

[73] Assignee: W. R. Grace & Co.-Conn., New York, N.Y.

[21] Appl. No.: 327,268

[22] Filed: Oct. 21, 1994

[51] Int. Cl.⁶ .............................. H01M 4/16; H01M 4/04
[52] U.S. Cl. ................. 429/217; 429/218; 429/232; 429/225; 429/162
[58] Field of Search ........................... 429/127, 162, 429/217, 225, 218, 232

[56] References Cited

U.S. PATENT DOCUMENTS

| | | | |
|---|---|---|---|
| 4,048,406 | 9/1977 | Sándera et al. | 429/217 |
| 4,548,835 | 10/1985 | Tahahashi et al. | 429/225 |
| 4,853,305 | 8/1989 | Anderman et al. | 429/217 |
| 5,166,008 | 11/1992 | Tomida et al. | 429/217 |
| 5,401,598 | 3/1995 | Miyabayashi et al. | 429/218 |
| 5,409,786 | 4/1995 | Bailey | 429/217 |

*Primary Examiner*—Prince Willis, Jr.
*Assistant Examiner*—Carol Chaney
*Attorney, Agent, or Firm*—Howard J. Troffkin

[57] ABSTRACT

A polymer bonded electrode composite composed of a polymer matrix having electrochemically active particulate therein and having a porous conductive sheet encapsulated within the matrix is disclosed. Further, a continuous process of forming the electrode composite by extrusion using a cross-head die is also disclosed.

7 Claims, No Drawings

FLEXIBLE ELECTRODE, PRODUCT AND PROCESS OF FORMING SAME

FIELD OF THE INVENTION

The present invention is directed to polymer bonded electrode products and to a process of forming same. More specifically, the present invention provides a highly filled chalcogenide-polymer bonded electrodes having a current collector element intimately contained within the electrode's thickness and an improved process of forming the subject electrode products.

Batteries have configurations composed of at least one pair of electrodes of opposite polarity and, generally, a series of adjacent electrodes of alternating polarity. The current flow between electrodes is maintained by an electrolyte composition capable of carrying ions across electrode pairs. In addition to these active components, there must be a material separating the electrodes of opposite polarity. When the electrolyte is liquid, a separator or component is used for this purpose. Such separators may be in many forms, such as grids, blocks, membrane sheets and the like formed of a non-conductive material. When the electrolyte composition is a solid or semi-solid material, it may provide the needed separation of electrodes.

Non-aqueous batteries have certain distinct advantages over other types of storage batteries. They use, as anodes, light weight alkali metals, or alloys thereof, either as the element, per se, or deposited on a substrate. The alkali metals, such as lithium, lithium-aluminum alloys and the like are at the far end of the electromotive series. These batteries have the potential for providing much higher gravimetric and volumetric energy densities (capacity per unit weight and volume, respectively) than other types of batteries, due to the low atomic weight of anodic metal and high potential for forming a battery in conjunction with suitable positive electrodes far removed from the light weight (alkali) metal electrode. The description herein will use batteries having lithium as the light weight metal anode although other light weight metals can be used. The battery can be formed in any conventional physical design, such as cylindrical, rectangular or disc-shaped "button" cells, normally of a closed cell configuration.

The battery components of positive electrode, negative electrode and separator can be in the form of distinct alternating plates in a sandwich design or of a continuous spirally wound design, as are well known. The anodic electrodes can be formed, for example, from lithium metal or its alloys on a support, such as a nickel coated screen. Alternately, the anodic electrode can be composed of a support sheet, such as a carbonous material having porosity and atomic structure suitable to have the alkali metal ions intercalated to a high degree therein.

The electrolyte can be formed of a non-aqueous solvent or fused or solid electrolyte. Illustrative of known useful non-aqueous solvents include acetonitrile, tetrahydrofuran and its derivatives, propylene carbonate, various sulfones and mixtures of these solvents containing a light metal salt such as lithium salts as, for example, lithium perchlorate, iodide or hexafluoroarsenate and the like. In addition, in certain battery configurations, the battery includes a passive separator membrane located between plates of opposite polarity to prevent contact between such plates while permitting electrolytic conduction.

Significant developments have been made in the fabrication of non-aqueous batteries. However, one of the major concerns is the lack of development of a suitable cathode in which the electrochemically cathodic material is present in the form of a porous, flexible, sheet material. The cathodic active material must be bonded into a unitary sheet by a material which is inert with respect to the other components of the battery as well as being inert and compatible to the active material. The bonding material must be capable of readily forming a uniform sheet. The resultant sheet must have the active material uniformly distributed throughout the length and breadth of the sheet as well as across its thickness to provide maximum effectiveness. The bonding material must be kept to very low amounts of the total sheet material or the cathodic active material will be encapsulated by the material and, thereby, dramatically reduce the conductivity and activity of the resultant cathodic sheet product. Even though present in only small amounts the bonding polymer must be capable of maintaining the sheet integrity and provide resistance to fractures, spalling and disintegration attributable to the expansion and contraction forces encountered in charge-discharge cycling.

Polymer bonded electrodes have been formed from slurries of EPDM (ethylene-propylene-diene terpolymer) in an organic medium, such as cyclohexane (see "Elastemic Binders for Electrodes" by S. P. S. Yen et al., J. Electrochem. Soc., Vol. 130, No. 5, Pg. 1107). Other noncrystalline, elastomeric polymers, such as sulfonated ionomers, butyl rubbers and the like have also been used in forming electrodes by a slurry technique (See U.S. Pat. No. 4,322,317). The resultant electrode products formed by a slurry technique exhibit elasticity and compatibility with the other battery components. However, the products cannot be readily formed in a manner which controls porosity and pore size distribution and they exhibit severe loss of activity after only a few charge/discharge cycles, as noted by the low figure of merit reported in U.S. Pat. No. 4,322,317.

Polymer bonded electrode sheet materials, per se, do not exhibit a high degree of electronic conductivity. They must, therefore, be placed and maintained in intimate contact with an electrically conductive element, normally called a "current collector", such as a conductive metal wire screen, fabric or the like. Conventionally, the initially formed polymer bonded sheet material is placed adjacent to a screen, fabric or the like of electrically conductive material and formed into a laminate by pressing the sheet and screen under pressure. This procedure has a number of drawbacks. It requires a multi-step process to form the resultant electrode and the laminating step must be highly controlled to avoid tearing and/or disintegration of the polymer bonded sheet material. The finished product must be carefully inspected and the torn or disintegrated sections must be discarded. Further, the laminated product normally has current collector material exposed on one surface, or, due to misalignment, at its edge portions. This exposed wire material presents a source of concern with respect to hindering the assembly of the battery components into its casing and/or causing puncture of the separator membrane and shorting of the battery.

More recently, polymer bonded electrodes were described in U.S. Pat. Nos. 4,735,875, 4,654,281, 4,791,037, 4,731,310, and 5,143,805. The products formed under the teachings of these referenced patents provide a flexible, microporous sheet material which possesses a high degree of mechanical integrity, strength and uniformity. However, these sheet products, as those described above, must be subsequently formed into laminated product which include a current collector element in order to produce a workable battery electrode.

It is highly desired to be able to provide a polymer bonded electrode composite which is capable of being readily fabricated without being labor intensive. Further, it is desired to provide a polymer-bonded electrode composite which can be formed with a very high content of electrochemically active particulate material, can exhibit a high degree of uniformity, is a flexible material which can be readily formed into desired configuration and can maintain its integrity under the conditions encountered in a battery (including expansion-contraction of cycling). Finally, it is highly desired to provide a polymer-bonded electrode as a composite which has a current collector element as an integral part of the electrode product and formed by a simple one step method.

The present electrode is suitable for use in forming either a cathodic or anodic electrode product composed of a polymer-bonded electrode composition which is integrally bonded to and encompasses a current collector element. The resultant product has good mechanical integrity, high flexibility and is capable of being formed into various configurations required for different battery designs.

SUMMARY OF THE INVENTION

The present invention is directed to a polymer bonded electrode composite and to a process of forming the same. The subject electrode composite comprises a microporous sheet composed of a substantially uniform mixture of a polymer and electrochemically active and electrically conductive materials which has a porous conductive sheet encapsulated therein.

DETAILED DESCRIPTION OF THE INVENTION

The present invention is directed to a polymer bonded electrode composite and to a process of forming the same. For purposes of clarity, certain terms used in the present description and in the appended claims have the following meanings:

A "battery" refers to a single electrochemical cell, or, alternately, to a multiple of electrochemical cells which are designed to operate in coordination with each other.

A "conductive sheet" refers to a porous sheet formed from at least one efficient electron conductive material which is capable of providing a low electronic resistance path between electrochemically active material and a battery terminal. Such conductive sheets are also known as "current collectors".

A "sheet" refers to a shaped product having extensive length and breadth dimensions and of cross-sections forming its thickness. The thickness is bound by two major surfaces and edge surfaces.

A "sheet matrix" refers to a microporous sheet composed of electrochemically active particulate material or a material capable of having active metal (e.g. lithium ions) intercalated therein. The microporous sheet matrix of the present invention is composed of a substantially uniform mixture comprising a minor amount of a polyolefin, a major amount of electrochemically active and electrically conductive particulate material and a minor amount of a plasticizer/processing agent for the polyolefin.

A "polymer bonded electrode composite" or "composite" refers to a sheet which has two major surfaces which form the boundaries of the sheet's thickness and is composed of a sheet matrix with a current collector encapsulated within its thickness.

The present invention is directed to a polymer bonded electrode composite, to a battery system containing said composite and an improved process for forming the composite. The electrode composite is composed of a sheet matrix which has a current collector encapsulated therein. The sheet matrix is a thin microporous sheet composed of a substantially uniform mixture of from about 2 to 30 weight percent polyolefin, about 70 to 98 weight percent of particulate material composed of electrochemically active electrically conductive materials and from 0 to about 10 weight percent of an organic processing agent for the polyolefin. Alternately, the sheet matrix component of the electrode composite can be formed with particulate material which is capable of intercalating electrochemically active alkali metal ions within its structure. The metal cations must be capable of being intercalated reversibly with a minimum of parasitic reaction, such as a reaction which would result in reduction of alkali metal salt in the electrolyte composition.

The sheet matrix of the present invention should be in the form of a very thin sheet of less than 100 mils, and preferably less than 20 mils in thickness. The thin sheet is bound by two major surfaces (having length and breadth dimensions of the sheet) with a thickness therebetween. The thickness is composed of a substantially uniform composition formed from a polymer and particulate filler, each of which is fully described hereinbelow. The matrix, in addition, contains a porous current collector which extends substantially the length and breadth of the sheet and is encapsulated within sheet matrix's two major surfaces.

The polymer-filler sheet matrix of the present invention has a very high filler content and high porosity of a microporous nature. The desired sheet matrix of the present invention can be formed by initially preparing a substantially uniform processing mixture of 2 to 25 (preferably 3–20) weight percent of polyolefin, 20 to 75 weight percent of inert filler (with a polymer-filler weight ratio of from 1:2.5 to 1:30, preferably 1:4 to 1:25) and the remaining percentage of the mixture being a processing agent and, optionally, minor amounts of colorants, wetting agents and the like.

The initially formed mixture should contain sufficient processing agent to impart fluidity to the mixture under the elevated temperature and pressure conditions required to form the initial sheet product. The amount of processing agent and polymer chosen should be capable of exhibiting sufficient flow and rheological characteristics to permit the mixture to be readily processed and shaped at relatively low temperatures (e.g. 25° C. to about 200° C.). The shaping is done by subjecting the mixture to high pressure extrusion utilizing a high pressure extrusion crosshead die adapted to insert a porous current collector into the extrudate prior to exiting from the die, as fully described hereinbelow.

The initially formed matrix composition of polymer-filler-processing agent having a porous current collector sheet encapsulated therein is further treated to remove the majority or all of the processing agent. This is done by suitable means, such as extraction of the agent with a liquid which is a solvent for the agent while being a non-solvent with respect to the polymer and filler.

The resultant composite is a flexible sheet which possesses a high degree of mechanical integrity, strength and uniformity, has a controlled pore volume of from 15 to 60 volume percent with pore size of narrow distribution and exhibits high conductivity of at least 0.1 reciprocal ohm-cm and preferably at least 0.3 reciprocal ohm-cm.

Each of the components and the process to form the subject sheet matrix is described hereinbelow in detail.

The present invention requires the utilization of a thermoplastic polymer which is inert with respect to the contemplated battery environment in which the resultant sheet product will be used. Illustrative of such thermoplastic polymers are polyolefins. The remainder of the description shall be, for illustrative purposes, described using a polyolefin as the matrix polymer component.

The polymer component of the sheet matrix may be a polyolefin having a weight average molecular weight of at least 75,000 and can be selected from polyolefins having a weight average molecular weight of from 75,000 to about 5,000,000. The polyolefin can be selected from homopolymers, such as polyethylene or polypropylene or from copolymers formed from a mixture of hydrocarbon olefin group (—HC═CH—) containing monomers, such as ethylene, propylene, butene and the like, or from a mixture of at least 80 percent, preferably, at least 90 percent by weight of such hydrocarbon olefinic monomer with other olefinic group containing monomer, such as acrylic and alkacrylic acids or their esters.

The polymer component used in forming the subject electrode product can be composed of a mixture of a high molecular weight and low molecular weight polyolefins. The mixture can be formed from about 5–95 weight percent of a high molecular weight polymer and a corresponding 95–5 weight percent of a low molecular weight polymer. The term "high molecular weight polymer" is intended to refer to a polymer having a weight average molecular weight of at least 500,000 and "low molecular polymer" refers to a polymer having a weight average molecular weight of from about 75,000 to 500,000.

The preferred polyolefins are polyethylene and polypropylene and most preferably a high density polyethylene.

The processing agent used in forming the instant composition must be present in the initial formulation used to form an initial sheet matrix, as more fully described below. The processing agent provides the means of fabricating the composition to a uniform consistency and to aid in inducing and controlling the degree of porosity, the pore size distribution and uniformity of porosity throughout the resultant sheet product.

Processing agents suitable for the instant invention are compounds which are capable of plasticizing the matrix's polymer component under the elevated temperature and/or pressure process conditions, substantially inert with respect to the particulate material used herein, and are substantially soluble in an organic solvent which is a non-solvent with respect to the polymer component described above and the particulate material described below which are used in forming a particular composition. Representatives of such plasticizers are organic esters, such as sebacates, phthalates, stearates, adipates and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; coumarone-indene resins and terpene resins; tall oil and linseed oil. The preferred processing agents are hydrocarbon materials and most preferably, petroleum oils. When the electrode is designed for use in a lithium battery, the processing agent is generally substantially free of water (anhydrous) and, therefore, compatible with such battery system.

The organic processing agent used herein aids in fabricating the sheet product and in imparting microporosity to the resultant sheet. The void volume of the resultant sheet will be directly dependent upon the amount of agent used to form the initial composition and the amount of agent extracted to provide the final polymer electrode composite. Void volumes of the final composite may range from about 15 to about 60 volume percent with from about 25 to 40 volume percent being preferred. Higher ranges are normally acceptable for composites having higher cross-sectional dimensions. The void volume is of a microporous character which generally have narrow distribution and are of low mean diameter (i.e. 0.05 to 0.5 microns) and can be determined by standard mercury intrusion techniques.

The particulate material required in forming the present admixture and the resultant sheet is composed of electrochemically active and electrically conductive materials. They must be in particulate form. Smaller particle size material (such as mean particle size of about 30 microns or less and preferably less than 15 microns) is preferred to enhance intimate contact between the particles of electrochemically active material contained in the resultant electrode. The term "electrochemically active" refers herein and in the appended claims to the ability of a material to enter and participate in a redox reaction during the operation and in the environment of an electrochemical cell. The term "electrically conductive" refers herein and in the appended claims to the ability of a material to exhibit low resistance to the passage of electrons.

The particulate material used to form cathodic electrodes can be selected from the chalcogenide compounds described below alone or with electrically conductive diluent also described below. The materials should be capable of providing an electrode sheet product capable of exhibiting an overall conductivity of at least about 0.1 reciprocal ohm-cm. When a cathodically-active material has low electrical conductivity (the majority of the chalcogenide exhibit less than about 0.001 reciprocal ohm-cm) they must be used in combination with conductive diluent, as described below.

The particulate material can be one or more of the chalcogenide compounds which have the appropriate crystal structure to exhibit electrical conductivity. The compounds are selected from sulfides, oxides, selenides, and tellurides of titanium, zirconium, hafnium, niobium, cobalt, nickel, manganese, copper, iron, tantalum, chromium, and vanadium. In general, such chalcogenides contain about 1.8 to about 3.2 atoms of the chalcogen per metal atom. The chalcogenide can be also formed from a mixture of metal atoms, including alkali metal atoms, such as lithium. When forming a secondary battery, the cathodic electrode is preferably selected from chalcogens of manganese, cobalt and nickel and most preferably oxides of manganese. Mixed metal salts which would be useful are, for example, $LiMn_2O_4$; $LiNiO_2$; $LiCoO_2$ and the like. These can be formed by known techniques such as by mixing, under high temperatures (e.g. 400° to 600° C.), a lithium salt, such as lithium nitrate, lithium oxide, lithium carbonate and the like, with a chalcogenide such as magnesium oxide, nickel oxide and the like. When forming an electrode suitable for a primary battery, the preferred chalcogenide are those formed from vanadium, such as $V_2O_5$, $V_6O_{13}$ and the like, iron and copper such as iron sulfides, copper sulfides and the like. Such chalcogenides contain from about 1.8 to about 2.1 atoms of chalcogen per metal atom and are generally referred to as dischalcogenides.

Examples of other cathode-active materials which may be useful are manganese dioxide, titanium disulfide, zirconium disulfide, hafnium disulfide, niobium triselenide, tantalum disulfide, vanadium disulfide, vanadium diselenide and vanadium ditelluride as well as vanadium oxide such as $V_3O_8$ and $V_6O_{13}$. Also included are the chalcogenides having more than one of the mentioned metals, e.g., $V_{0.25}Ti_{0.75}S_2$. Lastly, it should be noted that while the trichalcogenides and dichalcogenides are described, the present invention is not limited thereto and may include, for example, the pentachalcogenides and the like.

The present invention further contemplates the formation of a polymer anodic battery electrode composite which utilizes a particulate filler material capable of having lithium ions intercalated within its structure. The particulate filler material for forming such electrode composite must be capable of intercalating cations, such as lithium, reversibly with a minimum of parasitic reaction. The cation source is normally initially derived from the doped electrolyte composition. The filler, in this embodiment, must not cause a reduction in the cation concentration within the electrolyte composition once a steady state has been achieved. Carbons suitable for providing the desired support particulate can be, for example, graphite (natural, synthetic, or calcination of petroleum coke or the like), meso phase pitch coke (petroleum residue calcined at very high temperatures), resin based polymers and the like.

Another embodiment of the present invention utilizes a filler component for the sheet matrix which is composed of a support which has electrochemically active material deposited thereon. For example, porous silica or ceramic particles can be coated with electrochemically active material. In one instance, a porous silica can be coated with lead. Polymer bonded composite electrodes having lead as the active material, as provided herein, have the advantage of having substantial increase in energy density (output per unit weight of the resultant battery over conventional electrodes of lead-acid batteries). The use of a coated support filler component has advantages in other battery systems where the active metal is heavier and/or more expensive than the particulate's support material. Depositing of the active material on the support's surface can be accomplished by known techniques of vacuum deposition, slurry coating and the like.

The mean particle size of the filler should be 30 microns or less, preferably 20 microns or less and most preferably 15 microns or less. Smaller particle size material is preferred to enhance intimate contact between the particles.

The particulate may further comprise minor amounts (up to about 30 weight percent, preferably up to about 20 weight percent) of conductive diluent such as high surface area conductive carbon black. The diluent is normally of ultrafine particle size of from about 1 to 100 millimicrons and has a (BET) surface area of at least 40 $m^2/g$, preferably at least 70 $m^2/g$ and most preferably from 70 to 2000 $m^2/g$. The carbon can serve several roles to enhance the subject electrode. In instances where a particulate formed of a chalcogenide is used and the chalcogenide has good electronic conductivity, the carbon merely acts as an electrical conductive bridge between particles of chalcogenide to further enhance the total properties of the resultant electrode composite. Where the chalcogenide particulate has poor electronic conductivity, i.e. $V_2O_5$ (high resistance) the conductive diluent provides a means for carrying the electron to the current collector from the electrochemically active chalcogenide site.

The particulate material, either singly or in combinations as described herein, must be capable, when placed in the present polymer matrix, of causing the resultant electrode sheet product of this invention to exhibit an overall electrical conductivity of at least about 0.1 (preferably 0.3) reciprocal ohm-cm. It is known that most materials which are capable of exhibiting cathodic activity have normally been found to provide very low conductivity of, for example, less than 0.001 reciprocal ohm-cm in prior art products.

In addition to the above described components, the initially formed admixture may further contain conventional stabilizers, antioxidants, setting agents, processing aids or mixtures thereof. Representative of stabilizers are 4,4-thiobis(6-tertbutyl-m-cresol) sold commercially under the tradename "Santonox" and 2,6-ditert-butyl-4-methylphenol sold commercially under the tradename "Ionol". Examples of known commercially available wetting agents include sodium alkyl benzenesulfonate, sodium lauryl sulfate, dioctyl sodium sulfosuccinate, and isoctyl phenyl polyethoxyethanol.

The above-described components can be readily formed into a substantially homogeneous admixture. The initial admixture should be formed by blending from about 2 to 25 (preferably 3–20) volume percent polymer, from about 20 to 75 (preferably 40 to 60) volume percent of particulate material (a polymer to particulate ratio of from about 1:2.5 to 1:30, preferably from 1:4 to 1:25) and from about 20 to 50 volume percent of polymeric plasticizer/processing agent.

The blending of the components can be readily accomplished by conventional means such as by initially mixing at room temperature in a blender and then in a Banbury, Brabender or sigma blade mixer or the like at moderate (about 25° to about 170° C., preferably from about 120° to about 160° C.) temperatures. The blending and processing is preferably done under dry conditions to avoid water pick-up by the materials.

It has been found that even though the present sheet matrix has extremely high particulate content, the admixtures required by the present invention exhibit rheological properties which permit them to be readily shaped and formed into thin composites of less than about 100 mils, preferably less than about 20 mils. It must be understood that the particular thickness can be customized by the artisan based on the battery design and its acceptable drain rate. Electrodes made by presently known conventional techniques cannot be formed of such thin dimensions and maintain good mechanical properties as is attainable to composites of the present invention.

The sheet product of the present invention has a conductive sheet contained within the thickness of the sheet product. The conductive sheet can be in the form of a scrim, a woven, non-woven or knit fiber which is formed from a continuous or non-continuous fibrous material. Alternately, the sheet can be formed from expanded metal suitable for providing the current collector of the subject electrode. The conductive sheet is preferably formed from a substantially uniform, thin denier conductive fiber (denier of from about 0.02 to 10) to assure that the sheet is contained within the body of the matrix. The particular thickness of the sheet should be less than about 0.8 (preferably less than about 0.4) of the thickness of the sheet product. A current collector sheet should extend for substantially the full length and breadth of the resultant composite and be contained in the middle or skewed within the matrix's thickness.

The polymer/particulate/processing agent composition must be initially mixed into a substantially uniform mixture by conventional manners. For example, the components can be premixed at room temperature in a blender and then fluxed in a conventional mixer such as a Banbury mixer or melt blended in a two roll mill.

The highly filled nature and very high viscosity of the initial mixture requires specific processing conditions to achieve the present composite product. It has been unexpectedly found that the initial mixture can be formed into the desired electrode composite product by an extrusion technique which utilizes a cross head die adapted to provide a ribbon or planar sheet product of desired width. Conventional crosshead dies are used to coat single strands of wire or a series of wire strands to provide a coated single cable or a ribbon cable product.

In a crosshead die, the inlet flow of the initial matrix mixture is perpendicular to the outlet flow. Thus, the mixture proceeds through a conventional extrusion apparatus in which the mixture is transported through its chambers while heating and delivered to the inlet of the cross head die. The heating can be done in series. The normal operating temperature will depend on the glass transition temperature of the particular thermoplastic polymer being used and the desired melt viscosity to provide uniform extrudate. With respect to polyolefin/particulate/processing agent compositions, as contemplated herein, the operating temperature ranges from about 100° C. to 240° C. In the die, the processing mixture makes a 90° turn and splits to provide two feeds (one upper and one lower). At the same time, the conductive sheet is fed into the die through a separate mandrel and is positioned between the two feeds within the die. The mixture feeds and the conductive sheet meet close to the die's exit. In this region, the feeds recombine while encapsulating the porous conductive sheet within its core.

The initially formed sheet composite is removed from the cross-head die, may be subjected to calendering to establish a uniform thickness and then allowed to at least partially cool before subjected to extraction to remove the processing agent.

The procedure for extraction of the processing aid from a sheet product is well known and is not meant to form a part of the present invention, per se. A single or multiple stage extraction can be used. The solvent or extraction conditions should be chosen so that the polymer and filler components are essentially insoluble. For example, when petroleum oil is to be extracted from the initially formed sheet, the following solvents are suitable; chlorinated hydrocarbons, such as trichloroethylene, perchloroethylene, carbon tetrachloride, methylene chloride, 1,1,1-trichloroethane, and the like; hydrocarbon solvents such as hexane, benzene, petroleum ether, toluene, cyclohexane, gasoline, and the like.

The extraction temperature can range anywhere from room temperature up to a temperature below (preferably at least 10° C. below) the lowest melting or degradation temperature of the polymer.

The time of the extraction will vary depending upon the temperature used and the nature of the processing aid being extracted. For example, when a higher temperature is used, the extraction time for an oil of low viscosity may be only a few minutes, whereas, if the extraction is performed at room temperature, the time requirement for removal of the processing agent can be in order of several hours.

The composition of the resultant sheet product will depend upon the degree of extraction of the processing agent. The processing agent can be substantially completely removed, leaving a highly filled composite sheet product or, alternatively, can have 60 percent and, preferably, 75 percent of the processing agent of the mixture removed. The resultant sheet product is thus composed of polymer-active particulate matrix having the 1:2.5 to 1:30 wt. ratio as in the initial processing mixture with from 0 to about 20 wt. percent, preferably from 0 to 10 wt percent processing agent incorporated therein. The microporous layer of the sheet product normally has from about 5 to 25 weight percent thermoplastic polymer, about 75 to 95. weight percent active particulate and from 0 to 10 percent processing agent.

The resultant composite sheet product has a microporous matrix with a porous current collector sheet encapsulated therein. The sheet product has a length and breadth and a predetermined thickness which should be less than about 100 mils, preferably less than about 20 mils, and most preferably less than about 10 mils. Very thin, flexible composites having good mechanical properties of tensile strength and modulus of elasticity have been unexpectedly formed. It is well known that the inclusion of high levels of particulate into a polymeric matrix would presumably cause the sheet product to have increased brittle characteristics while the high porosity would be presumed to cause a sheet product of very low tensile strength and poor integrity. In contrast, it has been unexpectedly found that the sheet product of the present invention provides all of the desired properties for a battery electrode including strength, flexibility, very low electrolytic resistance, good integrity, etc.

The following examples are given for illustrative purposes only and are not meant to be a limitation on the invention as defined by the claims appended hereto.

EXAMPLES

Formation of Matrix Composition

A mixture suitable for forming a matrix of the subject electrode composite was formed by mixing, in a Hobart mixer, 1.05 parts high density, ultra-high weight average molecular weight (5,000,000) polyethylene, 2.45 parts high density polyethylene having a weight average molecular weight of 250,000 and 18.82 parts hydrocarbon petroleum oil for a short period. While mixing was continued 0.7 part graphite and 4.2 parts carbon black and then 72.73 parts lithiated cobalt oxide salt were added and mixed until uniform consistency was achieved. The mixture was transferred to a Haake twin screw extruder where it was further compounded at 110°–150° C. and the extrudate was ground in a Wiley mill at ambient temperature.

Formation of Composite Electrodes

A Haake twin-screw extruder fitted with a slitted, flat cross-head die having dimensions of 3/8 inch by about 20 mils was used to form a composite sheet product. Aluminum screen having a thickness of 8.5 mils was fed to the cross-head die simultaneously with the feeding of the matrix composition formed above through the extruder. The extruder was set at 15 RPM and had a temperature gradient of from 130° to 150° C. The exiting product from the cross-head die was a composite sheet having the aluminum screen encapsulated in the matrix composition which was removed from the cross-head at 3.5 feet per minute using a Killion 3 roll stack. The product was subjected to hexane extraction baths to remove substantially all processing oil of the initial composite. The extracted sheet was passed through a three roll stack to produce a final microporous composite electrode of 21 mil thickness.

A second electrode composite was formed In the same manner as described above except that the slitted, flat cross-head die had an opening of one and nine sixteenth inch by 20 mils, extruder speed was 150° RPM, and the temperature gradient was between 130° to 200° C. to provide an initial composite exiting at 8 feet per minute. Half of the initially formed composite sheet was subjected to a series of hexane baths until substantially all of the petroleum oil processing agent was removed and then calendered at ambient temperature to provide electrode composite product having a thickness of about 12 mils. ("Electrode A"). The other half of the initially formed composite sheet was subjected to a hexane bath to remove a portion of the petroleum oil from the sheet. The sheet was then subjected to compaction at 100° C. and then again placed in a series of hexane baths to remove the remainder of the petroleum oil to produce a composite sheet having a thickness of about 13 mils. ("Electrode B").

Battery cell Formation and Testing

The Electrodes A and B described above were used to form a number of lithium/LiCoO$_2$ cells. The cells had a LiCoO$_2$ loading of 5.6 g (0.93 Ah theoretical capacity at 0.6 e/mole), and a cathode area of 167 cm$^2$ (both sides). Cathode thickness was about 12 mils, porosity was 30% (IPA method). The electrolyte used in these cells is composed of 80% methyl formate (52 ppm water), 20% dimethyl carbonate (697 ppm water), 2.0M LiAsF$_6$, 0.4M LiBF$_4$.

All cells were cycled on the Maccor cycler at 1 ma/cm$^2$ discharge to 2.5 volts, 0.5 ma/cm$^2$ charge to 4.3 volts. A ten minute rest at open circuit is provided at the end of charge and discharge. Test results are given in Table I below.

TABLE I

| Electrode | Capacity @ 3 cycles Ah × 10$^2$ | Capacity @ 25 cycles Ah × 10$^2$ |
|---|---|---|
| A | 74 | 62 |
| A | 79 | 66 |
| A | 74 | 64 |
| A | 81 | 68 |
| A | 78 | 58 |
| A | 81 | 73 |
| B | 88 | 76 |
| B | 84 | 73 |
| B | 88 | 78 |
| B | 84 | 73 |
| B | 85 | 72 |
| B | 84 | 74 |
| B | 83 | 73 |

What is claimed:

1. A polymer bonded electrode composite comprising (i) a microporous sheet matrix having a first major surface and a second major surface of a length and breadth and having a thickness of up to about 100 mils contained between said first and second major surfaces; said sheet matrix comprising a substantially uniform mixture of a polyolefin and particulate material in a weight ratio of from 1:2.5 to 1:30 wherein the particulate material is composed of electrochemically active material coated on an inert substrate particulate and (ii) a porous conductive sheet extending the length and breadth and encapsulated within the thickness of the sheet matrix.

2. The electrode composite of claim 1 wherein the particulate of the sheet matrix is a mixture of said electrochemically active coated particulate and up to about 30 weight percent of electrically conductive particulate.

3. The electrode composite of claim 2 wherein the polymer is selected from polyethylene, polypropylene, and copolymers of at least two olefinic groups containing monomer; the electrochemically active coated material is selected from at least one chalcogenide or mixed metal chalcogenides; and the electrically conductive particulate is selected from high surface area conductive carbon black.

4. The electrode of claim 2 wherein the active material is lead and the substrate is particulate silica.

5. The electrode composite of claim 1 wherein the conductive sheet is selected from a scrim, woven, non-woven or knit fiber sheet or an expanded metal sheet.

6. The electrode composite of claim 5 wherein the conductive sheet is formed from a metal selected from copper, aluminum, or nickel.

7. An improved battery having at least one pair of oppositely charged electrodes, wherein this improvement comprises having the electrode consists essentially of claim 1, 2, 3, 4, 5 or 6.

* * * * *